(12) United States Patent
Henning

(10) Patent No.: US 8,918,557 B2
(45) Date of Patent: Dec. 23, 2014

(54) SAS EXPANDER AND METHOD TO ARBITRATE TRAFFIC IN A REDUNDANT EXPANDER SYSTEM

(75) Inventor: Brett J. Henning, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 259 days.

(21) Appl. No.: 13/422,376

(22) Filed: Mar. 16, 2012

(65) Prior Publication Data
US 2013/0246671 A1 Sep. 19, 2013

(51) Int. Cl.
*G06F 3/00* (2006.01)
*G06F 3/06* (2006.01)
*G06F 13/40* (2006.01)

(52) U.S. Cl.
CPC .............. *G06F 3/06* (2013.01); *G06F 3/0689* (2013.01); *G06F 13/4022* (2013.01)
USPC ................... 710/36; 710/37; 710/38; 710/39; 710/40; 710/41; 710/42; 710/43; 710/44; 710/45; 710/46; 710/47; 710/48; 710/49; 710/50; 710/51

(58) Field of Classification Search
CPC ....... G06F 3/06; G06F 3/0622; G06F 3/0689; G06F 13/4022
See application file for complete search history.

(56) References Cited

U.S. PATENT DOCUMENTS

| | | | | |
|---|---|---|---|---|
| 5,175,855 A * | 12/1992 | Putnam et al. | ................. | 719/321 |
| 6,594,696 B1 * | 7/2003 | Walker et al. | ................. | 709/223 |
| 7,028,106 B2 * | 4/2006 | Foster et al. | ...................... | 710/2 |
| 7,437,462 B2 * | 10/2008 | Marks et al. | ................... | 709/226 |
| 7,584,319 B1 * | 9/2009 | Liao et al. | ...................... | 710/317 |
| 7,849,248 B2 * | 12/2010 | Johnson et al. | ............... | 710/300 |
| 7,913,023 B2 * | 3/2011 | Johnson et al. | ............... | 710/307 |
| 7,913,037 B2 * | 3/2011 | Nakajima et al. | ............. | 711/114 |
| 7,958,282 B2 * | 6/2011 | Odenwald et al. | .............. | 710/42 |
| 8,077,605 B2 * | 12/2011 | McCarty et al. | ............... | 370/225 |
| 8,095,722 B1 * | 1/2012 | Liao et al. | ...................... | 710/317 |
| 8,116,226 B1 * | 2/2012 | Liao et al. | ...................... | 370/254 |
| 8,244,948 B2 * | 8/2012 | Johnson et al. | ............... | 710/300 |
| 8,255,607 B2 * | 8/2012 | Jones et al. | .................... | 710/316 |
| 8,307,155 B1 * | 11/2012 | Chatterjee et al. | ............ | 711/113 |
| 8,321,596 B2 * | 11/2012 | Johnson et al. | .................. | 710/2 |
| 8,626,981 B1 * | 1/2014 | Roberts et al. | ................ | 710/316 |
| 2001/0047412 A1 * | 11/2001 | Weinman, Jr. | ................ | 709/225 |
| 2005/0066100 A1 * | 3/2005 | Elliott et al. | ................... | 710/300 |
| 2006/0101171 A1 * | 5/2006 | Grieff et al. | ..................... | 710/36 |
| 2006/0271722 A1 * | 11/2006 | Marushak et al. | ............ | 710/316 |
| 2007/0274231 A1 * | 11/2007 | Marks et al. | ................... | 370/254 |

(Continued)

OTHER PUBLICATIONS

"Managing Access Control Through SAS Zoning" by Heng Liao, Tim Symons, Rachelle Trent; Sep. 2005, © PMC-Sierra, Inc.*

(Continued)

*Primary Examiner* — Henry Tsai
*Assistant Examiner* — Jing-Yih Shyu
(74) *Attorney, Agent, or Firm* — Suiter Swantz pc llo

(57) ABSTRACT

A SAS expander configured to operate as a SAS expander hub receives IO requests from a plurality of connected SAS expanders. Each SAS expander determines if it is capable of servicing a received IO request and sending such IO requests to the SAS expander hub if necessary. The SAS expander hub relays the IO requests to SAS expanders connected to data storage devices capable of servicing such IO requests.

12 Claims, 6 Drawing Sheets

(56) References Cited

U.S. PATENT DOCUMENTS

| | | | |
|---|---|---|---|
| 2008/0010530 A1* | 1/2008 | Davies et al. | 714/31 |
| 2008/0162987 A1* | 7/2008 | El-Batal | 714/6 |
| 2008/0313658 A1* | 12/2008 | Cagno et al. | 719/326 |
| 2009/0094620 A1* | 4/2009 | Kalwitz et al. | 719/325 |
| 2010/0064060 A1* | 3/2010 | Johnson et al. | 710/2 |
| 2010/0064085 A1 | 3/2010 | Johnson et al. | |
| 2010/0215041 A1* | 8/2010 | Petty | 370/392 |
| 2011/0191637 A1* | 8/2011 | Wight et al. | 714/43 |
| 2011/0191644 A1* | 8/2011 | Oldfield et al. | 714/704 |
| 2011/0320708 A1* | 12/2011 | Otaka et al. | 711/114 |
| 2012/0011287 A1* | 1/2012 | Zeung et al. | 710/16 |
| 2012/0066420 A1* | 3/2012 | Nakajima | 710/74 |
| 2012/0226854 A1* | 9/2012 | Williams et al. | 711/114 |
| 2012/0311224 A1* | 12/2012 | Myrah et al. | 710/316 |

OTHER PUBLICATIONS

"Information technology—Serial Attached SCSI (SAS)" Working Draft American National Standard; Robert C Elliott Hewlett-Packard Corporation, Revision 5, Jul. 9, 2003.*

"PM8398 SXP 36x3GSec 36 Port SAS Expander Hardware Specification" PMC-Sierra, Inc., Sep. 2005.*

"05-212r0 SAS-2 System design considerations" by Barry Olawsky and Rob Elliott, HP, 2003.*

* cited by examiner

SAS EXPANDER AND METHOD TO ARBITRATE TRAFFIC IN A REDUNDANT EXPANDER SYSTEM

FIELD OF THE INVENTION

The present invention is directed generally toward expanders, and more particularly toward SAS expanders connected by inter expander links.

BACKGROUND OF THE INVENTION

Serial Attached SCSI (SAS) Expanders facilitate communication between large numbers of SAS devices. Expanders contain two or more external expander-ports. Each expander device contains at least one SAS Management Protocol target port for management and may contain SAS devices itself. For example, an expander may include a Serial SCSI Protocol target port for access to a peripheral device. An expander is not necessary to interface a SAS initiator and target but allows a single initiator to communicate with more SAS/SATA targets. A useful analogy: one can regard an expander as akin to a network switch in a network which allows multiple systems to be connected using a single switch port. Expanders exist to allow more complex interconnect topologies. Expanders assist in link-switching (as opposed to packet-switching) end-devices (initiators or targets). They may locate an end-device either directly (when the end-device is connected to it), via a routing table (a mapping of end-device IDs and the expander the link should be switched to downstream to route towards that ID), or when those methods fail, via subtractive routing: the link is routed to a single expander connected to a subtractive routing port. If there is no expander connected to a subtractive port, the end-device cannot be reached.

The current SAS switch uses a system of dedicated inter expander links (IELs) to connect two expanders together into a system that provides port redundancy and improved performance. If this type of system were to be used to connect four expanders, the interconnects would be spread out between more expanders, resulting in fewer IELs per expander pair resulting in lower bandwidth between expanders. As the number of interconnected expanders increases, the problems get worse.

Consequently, it would be advantageous if an apparatus existed that is suitable for interconnecting four or more expanders together while maintaining bandwidth between the expanders.

SUMMARY OF THE INVENTION

Accordingly, the present invention is directed to a novel method and apparatus for interconnecting four or more expanders together while maintaining bandwidth between the expanders.

One embodiment of the present invention is a SAS expander hub configured to connect to a plurality of SAS expanders. The SAS expander hub routes data traffic from one SAS expander to another so that the individual SAS expanders do not need to be interconnected to each other.

Another embodiment of the present invention is a method for routing data traffic in a system of SAS expanders where the SAS expanders are each connected to an SAS expander hub.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
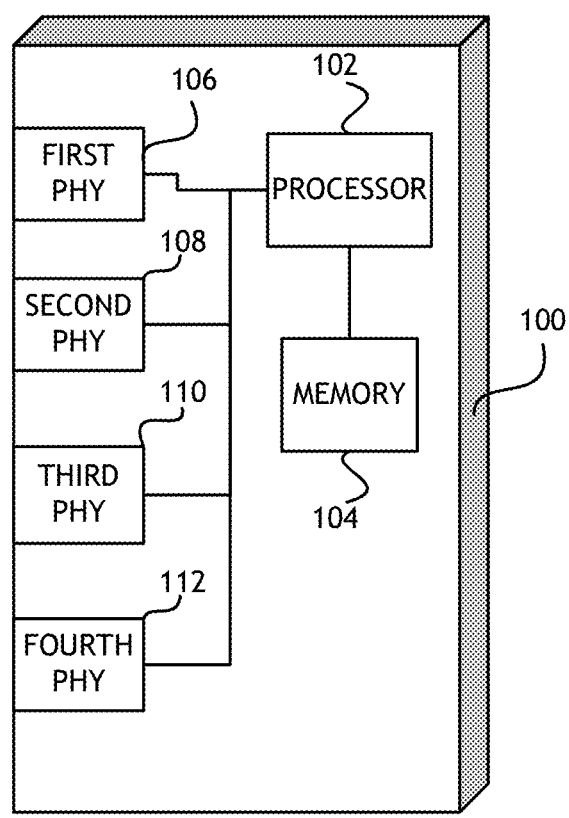
FIG. 1 shows a block diagram of a SAS expander.

Referring to FIG. 1, a block diagram of a Serial Attached SCSI (SAS) expander 100 is shown. The SAS expander 100 may have a processor 102 connected to a memory 104, and a plurality of PHYs 106,108,110,112, also connected to the processor 102. PHYs 106,108,110,112 are the physical hardware connection points in a SAS expander 100. One skilled in the art will appreciate that while four PHYs 106,108,110,112 are shown, in actual implementation, a SAS expander may include more than four PHYs 106,108,110,112; for example, some implementations may include thirty-six, forty-eight, ninety-six, or even more PHYs 106,108,110,112.

A SAS expander 100 may be connected to one or more initiator devices through one or more PHYs 106,108,110,112, and it may be connected to one or more target devices through one or more PHYs 106,108,110,112. Two or more PHYs 106,108,110,112 may be connected to the same initiator device or target device to form a wide port. Data bandwidth between a SAS expander 100 and an initiator device or target device may be defined by the number of PHYs 106, 108,110,112 connecting the SAS expander to the initiator device of target device.

Figure 2:
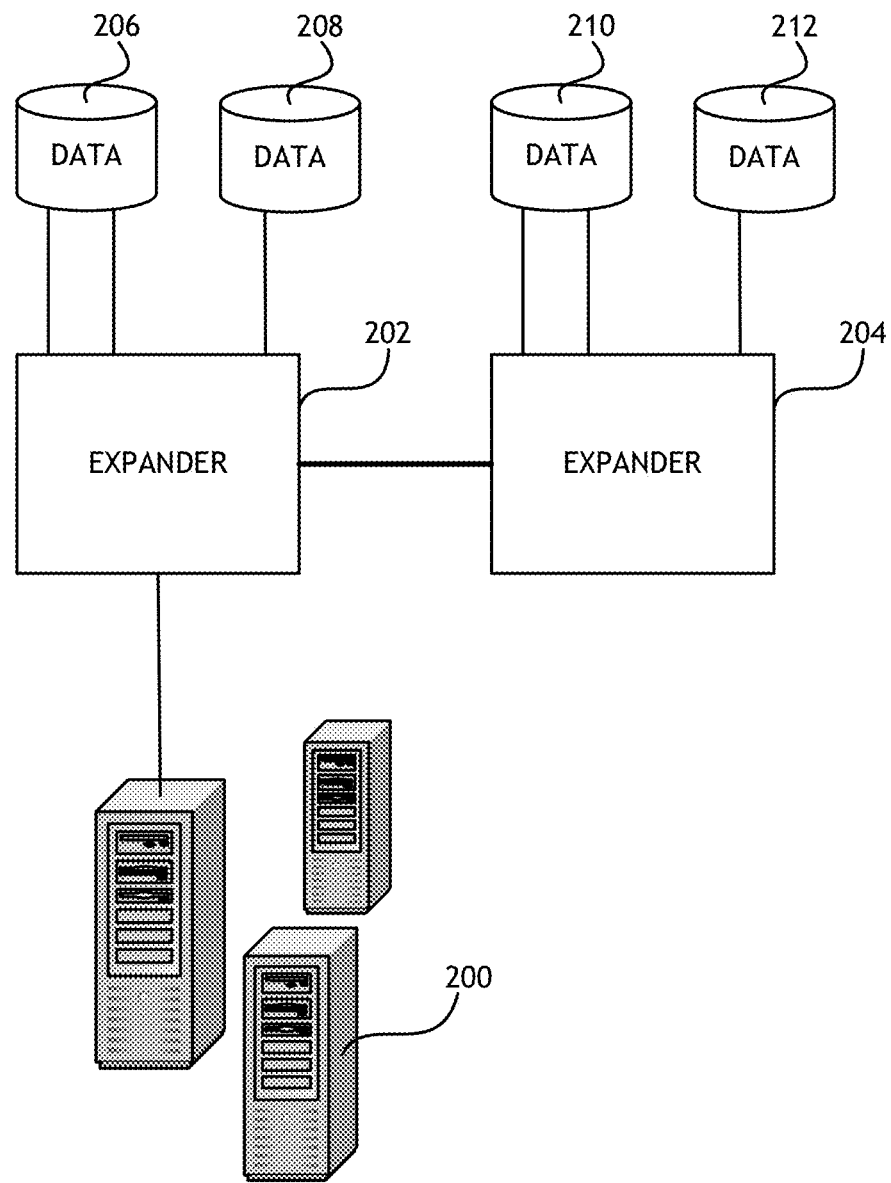
FIG. 2 shows a block diagram of a system including two SAS expanders connected by inter expander links (IELs)

Referring to FIG. 2, a block diagram of a system including two SAS expanders is shown. The system may include a first SAS expander 202. The first SAS expander 202 may be connected to a first data storage device 206 and a second data storage device 208. The first SAS expander 202 may be connected to each of the first data storage device 206 and second data storage device 208 through one or more PHYs. The first SAS expander 202 may also be connected to an initiator 200 through one or more PHYs. The system may also include a second SAS expander 204. The second SAS expander 204 may be connected to a third data storage device 210 and a fourth data storage device 212. The second SAS expander 204 may be connected to each of the third data storage device 210 and fourth data storage device 212 through one or more PHYs. The first SAS expander 202 and second SAS expander 204 may also be connected to each other through one or more PHYs. Direct links between SAS expanders are called inter expander links (IELs). In practice, IELs typically comprise more than one PHY connection to provide increased bandwidth between two SAS expanders 202,204.

Where two SAS expanders 202,204 are connected by an IEL, each SAS expanders 202,204 may query the other SAS expander 202,204 to determine what data storage devices 206,208,210,212 are connected to that SAS expander 202, 204. Likewise, each SAS expander 202,204 may respond to such query. Each SAS expander 202,204 may thereby route data requests from initiators 200 as appropriate. For example, the first SAS expander 202 may query the second SAS expander 204 to discover that the second SAS expander 204 is connected to the third data storage device 210 and the fourth data storage device 212. If the initiator 200 then attempts to send an Input/Output (IO) request to the third data storage device 210, the first SAS expander 202 may relay such 10 request to the second SAS expander 204; the second SAS expander 204 may then execute the IO request and return an appropriate response to the first SAS expander 202, which may relay the response to the initiator 200.

Figure 3:
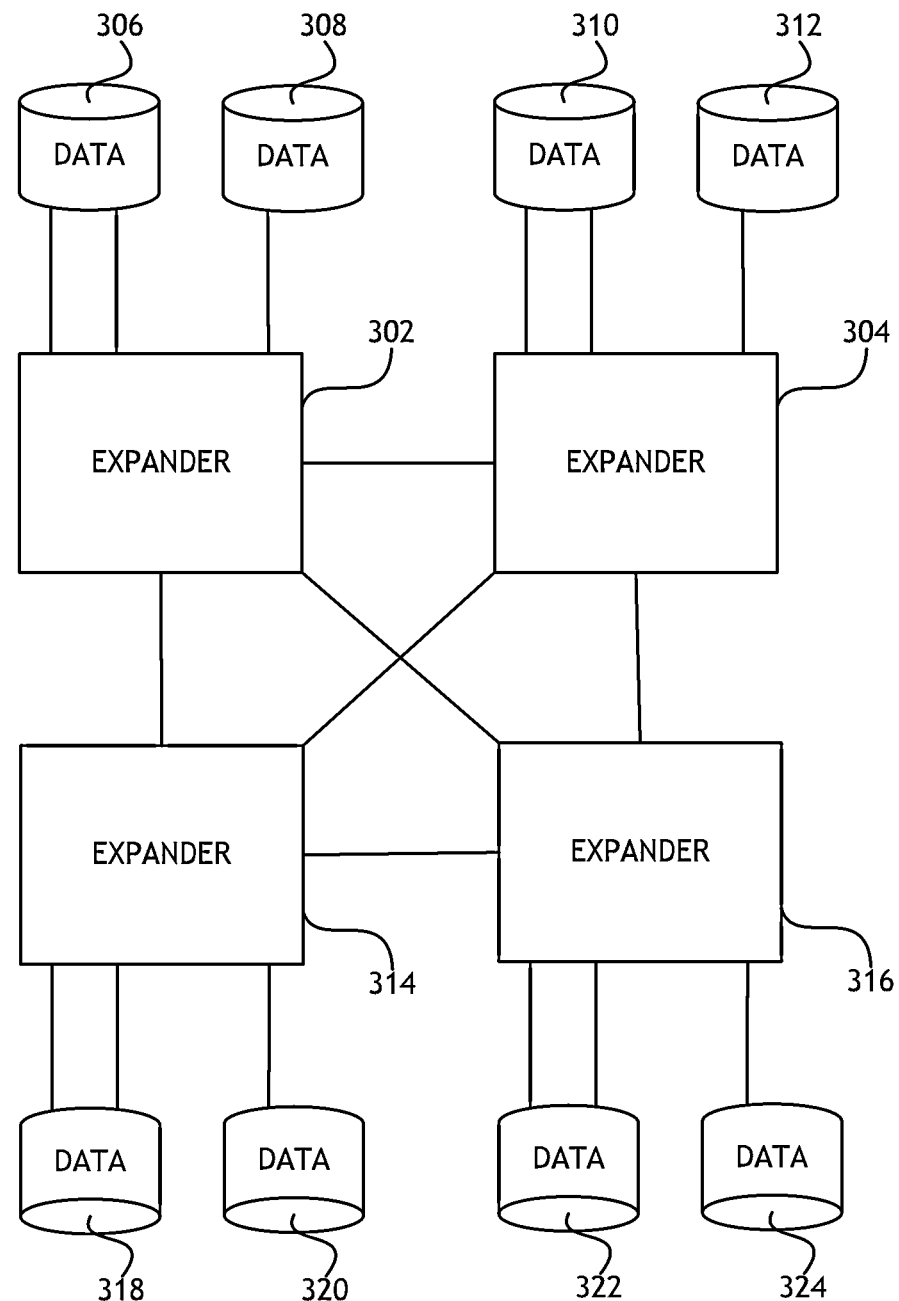
FIG. 3 shows a block diagram of a system including four SAS expanders connected by IELs.

Referring to FIG. 3, a block diagram of a system including four SAS expanders is shown. The system may include a first SAS expander 302. The first SAS expander 302 may be connected to a first data storage device 306 and a second data storage device 308 through one or more PHYs. The system may also include a second SAS expander 304. The second SAS expander 304 may be connected to a third data storage device 310 and a fourth data storage device 312 through one or more PHYs. The system may include a third SAS expander 314. The third SAS expander 314 may be connected to a fifth data storage device 318 and a sixth data storage device 320 through one or more PHYs. The system may also include a fourth SAS expander 316. The fourth SAS expander 316 may be connected to a seventh data storage device 322 and an eighth data storage device 324 through one or more PHYs. One skilled in the art will appreciate that in actual application, each SAS expander 302,304,314,316 may be connected to more than two data storage devices 306,308,310,312,318, 320,322,324. One skilled in the art will also appreciate that each SAS expander 302,304,314,316 may be connected to one or more initiators (not shown).

In order to relay IO requests effectively, each SAS expander 302,304,314,316 may be connected by IELs to every other SAS expander 302,304,314,316. The first SAS expander 302 may be connected to the second SAS expander 304 through one or more PHYs; the first SAS expander 302 may be connected to the third SAS expander 314 through one or more PHYs; and The first SAS expander 302 may be connected to the fourth SAS expander 316 through one or more PHYs. Likewise, the second SAS expander 304 may connected to the third SAS expander 314 and to the fourth SAS expander 316; and the third SAS expander may be connected to the fourth SAS expander 316. Each additional SAS expander 302,304,314,316 added to the system requires disproportionately more IELs than the last SAS expander added to the system 302,304,314,316, and additional complexity in wiring. Because SAS expanders 302,304,314,316 include a fixed number of PHYs, each additional SAS expander 302,304,314,316 must either reduce the number of PHYs available for storage devices 306,308,310,312,318,320,322,324 or, if the number of PHYs allocated to IELs is fixed, reduce the number of PHYs per IEL and thereby reduce the bandwidth between SAS expanders 302,304,314,316. In either case, there is a limit to the number of SAS expanders 302,304,314,316 that can be connected in such a system and each additional SAS expander 302,304, 314,316 degrades some aspect of the performance of the system.

Figure 4:
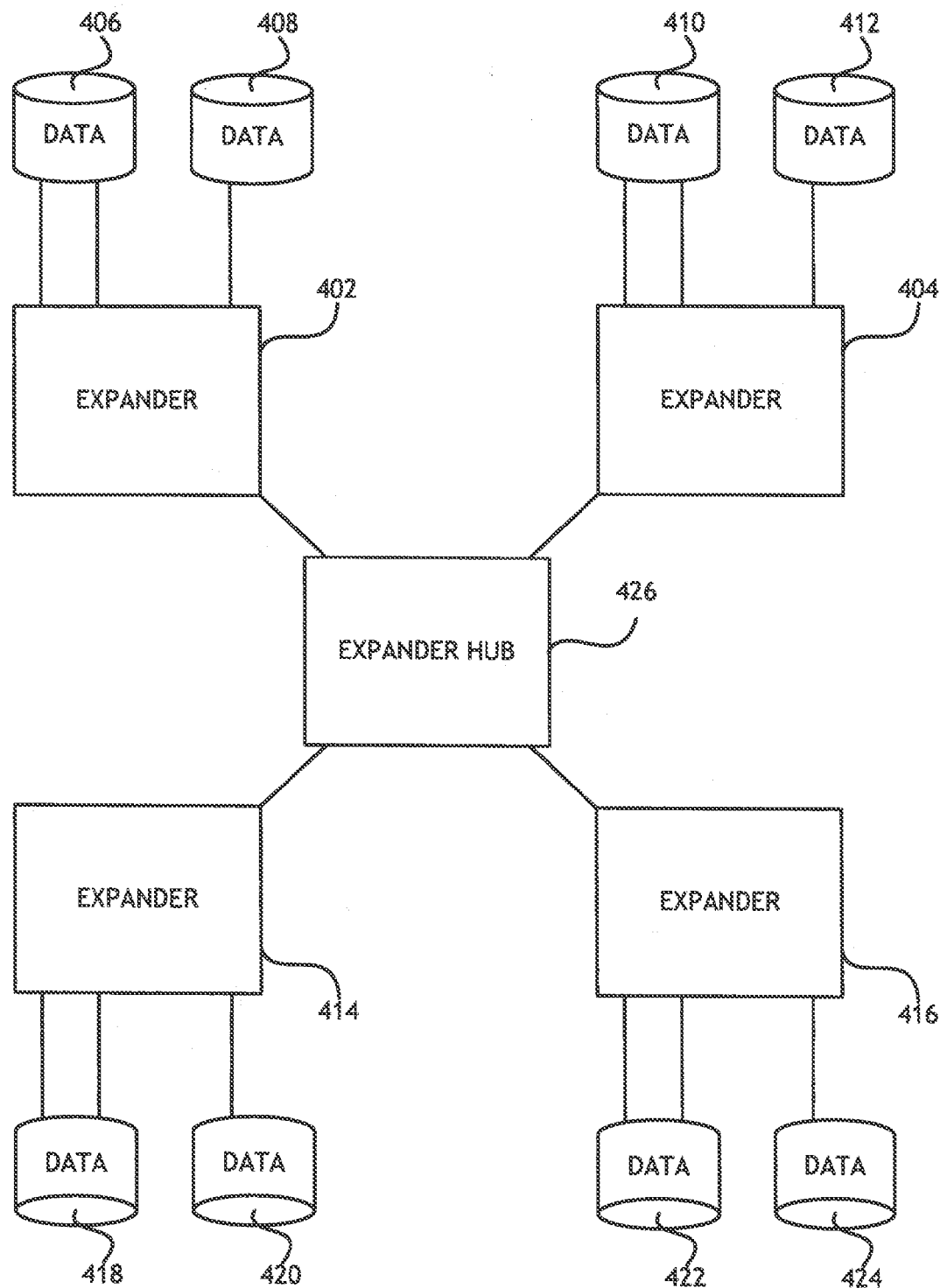
FIG. 4 shows a block diagram of a system including four SAS expanders and a SAS expander hub according to the present invention.

Referring to FIG. 4, a block diagram of a system including four SAS expanders and a SAS expander hub according to the present invention is shown. The system may include a first SAS expander 402. The first SAS expander 402 may be connected to a first data storage device 406 and a second data storage device 408 through one or more PHYs. The system may also include a second SAS expander 404. The second SAS expander 404 may be connected to a third data storage device 410 and a fourth data storage device 412 through one or more PHYs. The system may include a third SAS expander 414. The third SAS expander 414 may be connected to a fifth data storage device 418 and a sixth data storage device 420 through one or more PHYs. The system may also include a fourth SAS expander 416. The fourth SAS expander 416 may be connected to a seventh data storage device 422 and an eighth data storage device 424 through one or more PHYs. One skilled in the art will appreciate that in actual application, each SAS expander 402,404,414,416 may be connected to more than two data storage devices 406,408,410,412,418, 420,422,424. One skilled in the art will also appreciate that each SAS expander 402,404,414,416 may be connected to one or more initiators (not shown).

The system may also include a SAS expander hub 426. The SAS expander hub may be directly connected to the first SAS expander 402, the second SAS expander 404, the third SAS expander 414 and the fourth SAS expander 416 through IELs comprising one or more PHYs. The SAS expander hub 426 may comprise a processor configured to query each of the SAS expanders 402,404,414,416 to determine what data storage devices 406,408,410,412,418,420,422,424 are connected to which SAS expander 402,404,414,416. The SAS expander hub 426 may also comprise a memory connected to the processor for retaining a data structure configured to record the location of each data storage device 406,408,410,412,418, 420,422,424.

The SAS expander hub 426 processor may also be configured to respond to queries from the connected SAS expanders 402,404,414,416. Where the SAS expanders 402,404,414, 416 query the SAS expander hub 426, the SAS expander hub 426 may be configured to send a response enumerating each data storage device 406,408,410,412,418,420,422,424 connected to each SAS expander 402,404,414,416 that is connected to the SAS expander hub 426; or the SAS expander hub 426 may send a response indicating that the SAS expander hub 426 is a device capable of relaying IO requests generally, and that any IO requests not directly serviceable by the SAS expander 402,404,414,416 should be submitted to the SAS expander hub 426. Each of the first SAS expander 402, the second SAS expander 404, the third SAS expander 414 and the fourth SAS expander 416 may be configured to recognize that it is part of a system including an SAS expander hub 426, and to communicate with the SAS expander hub accordingly. For example, the first SAS expander 402 may forego attempting to determine what data storage devices are connected to the SAS expander hub 426. Each of the first SAS expander 402, the second SAS expander 404, the third SAS expander 414 and the fourth SAS expander 416 may include a processor that is generally configured to interact with each of the other SAS expanders 402,404,414, 416 and the SAS expander hub 426 in manner consistent with an integrated, cooperative topology rather than a single expander topology.

All of the PHYs in the SAS expander hub 426 may be dedicated to IELs while all of the PHYs dedicated to IELs in each SAS expander 402,404,414,416 may be connected to the SAS expander hub 426. All IELs for any particular SAS expander 402,404,414,416 may therefore be utilized during service of any IO request. Furthermore, in the event any one SAS expander 402,404,414,416 fails, none of the IELs of any other SAS expander 402,404,414,416 will be rendered inoperative.

Figure 5:
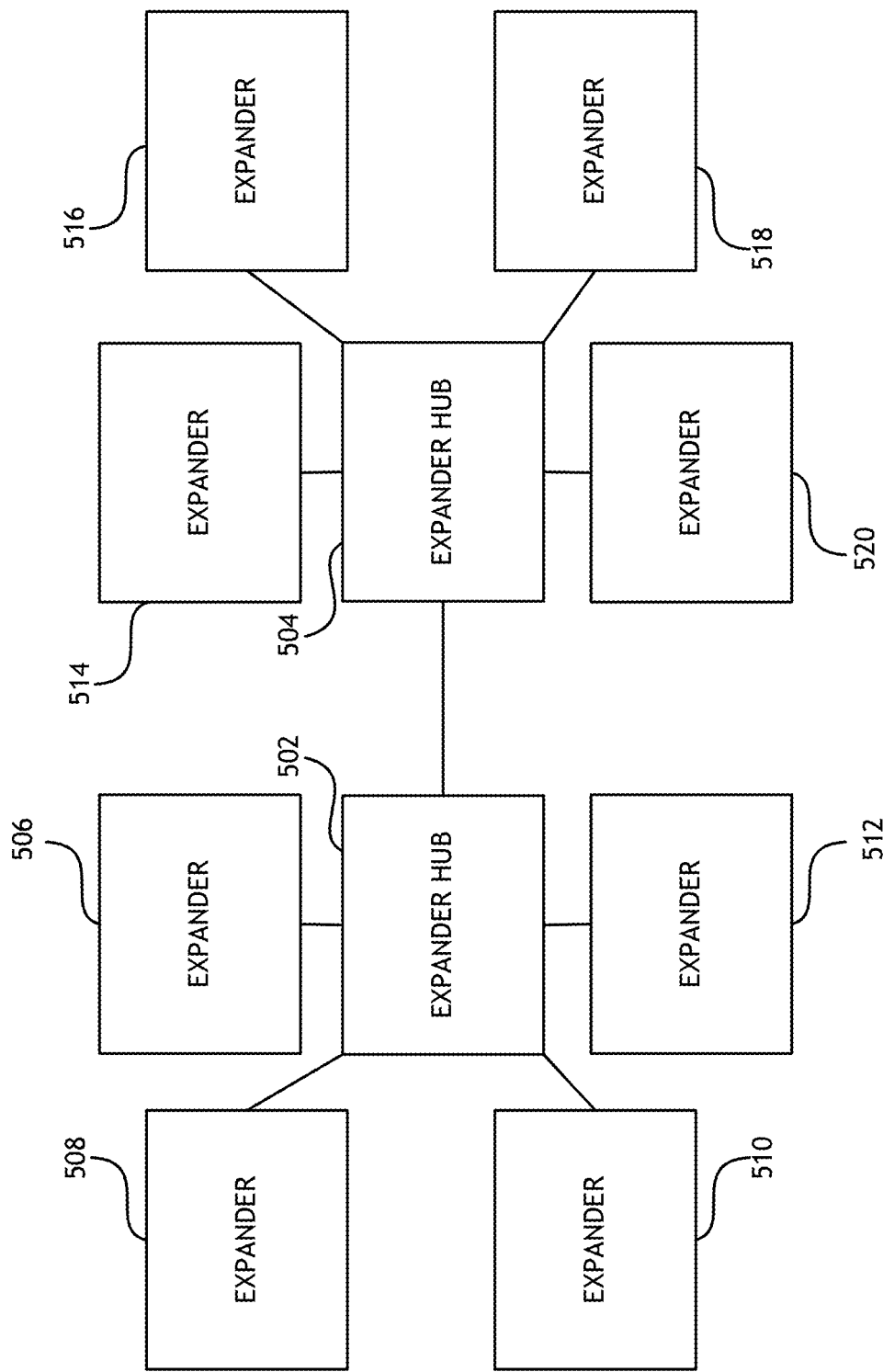
FIG. 5 shows a block diagram of a system including a plurality of SAS expanders and two SAS expander hubs according to the present invention.

Referring to FIG. 5, a block diagram of a system including two SAS expander hubs 502,504 according to the present invention is shown. The system may include a first SAS expander hub 502. The first SAS expander hub 502 may be connected to one or more SAS expanders 506,508,510,512 through IELs, each comprising one or more PHYs. The system may also include a second SAS expander hub 504. The second SAS expander hub 504 may be connected to one or more SAS expanders 514,516,518,520. One skilled in the art will appreciate that each of the SAS expanders 506,508,510, 512, 514,516,518,520 may be connected to one or more data storage devices (not shown) and to one or more initiators (not shown) through one or more PHYs.

The first SAS expander hub 502 may be connected to the second SAS expander hub 504 through an IEL comprising one or more PHYs. The processor in the first SAS expander hub 502 may be configured to send a signal to the second SAS expander hub 504 indicating that the first SAS expander hub 502 is a device capable of relaying IO requests. The processor in the second SAS expander hub 504 may be configured to receive a signal indicating that the first SAS expander hub 502 is a device capable of relaying IO requests, and recording such indication in a data structure. Likewise, the first SAS expander hub 502 may also discover and record the nature of the second SAS expander hub 504 as a device capable of relaying IO requests. Each SAS expander hub 502,504 may thereby relay IO requests to the other SAS expander hub 502,504 when such IO requests have been relayed to the SAS expander hub 502,504 and the IO request cannot be directly serviced by any of the SAS expanders 506,508,510,512,514, 516,518,520 directly connected to the SAS expander hub 502,504.

For example, an IO request may be submitted by an initiator to a first SAS expander 506. The first SAS expander 506 may determine that none of the data storage devices connected to the first SAS expander 506 can service the IO request. The first SAS expander may have previously determined through queries as described herein that the first SAS expander hub 502 is a device capable of relaying IO requests. The first SAS expander 506 may then relay the IO request to the first SAS expander hub 502. The first SAS expander hub 502 may reference a data structure of all the data storage devices connected to the SAS expanders 506,508,510,512 directly connected to the first SAS expander hub 502 and determine that none of those data storage devices can service the IO request. The first SAS expander hub 502 may have previously determined through queries as described herein that the second SAS expander hub 504 is a device capable of relaying IO requests. The first SAS expander hub 502 may then relay the IO request to the second SAS expander hub 504. The second SAS expander hub 504 may reference a data structure of all the data storage devices connected to the SAS expanders 514,516,518,520 directly connected to the second SAS expander hub 504 and determine that one of the data storage devices can service the IO request. The second SAS expander hub 504 may then relay the IO request to such data storage device through the appropriate SAS expander 514, 516,518,520. The appropriate SAS expander 514,516,518, 520 may then relay a response (such as requested data) to the second SAS expander hub 504. The second SAS expander hub 504 may then relay such response to the first SAS expander hub 502. The first SAS expander hub 502 may then relay the response to the first SAS expander 506, which would send the response to the initiator. Conversely, if no SAS expander hub 502,504 is capable of relaying an IO request to a data storage device capable of servicing the IO request, each SAS expander hub 502,504 may return a response to the relaying SAS expander hub 502,504 indicating that no path for executing the IO request was found.

By interconnecting SAS expander hubs 502,504, networks of SAS expanders may be made arbitrarily large while maintaining IEL bandwidth.

Figure 6:
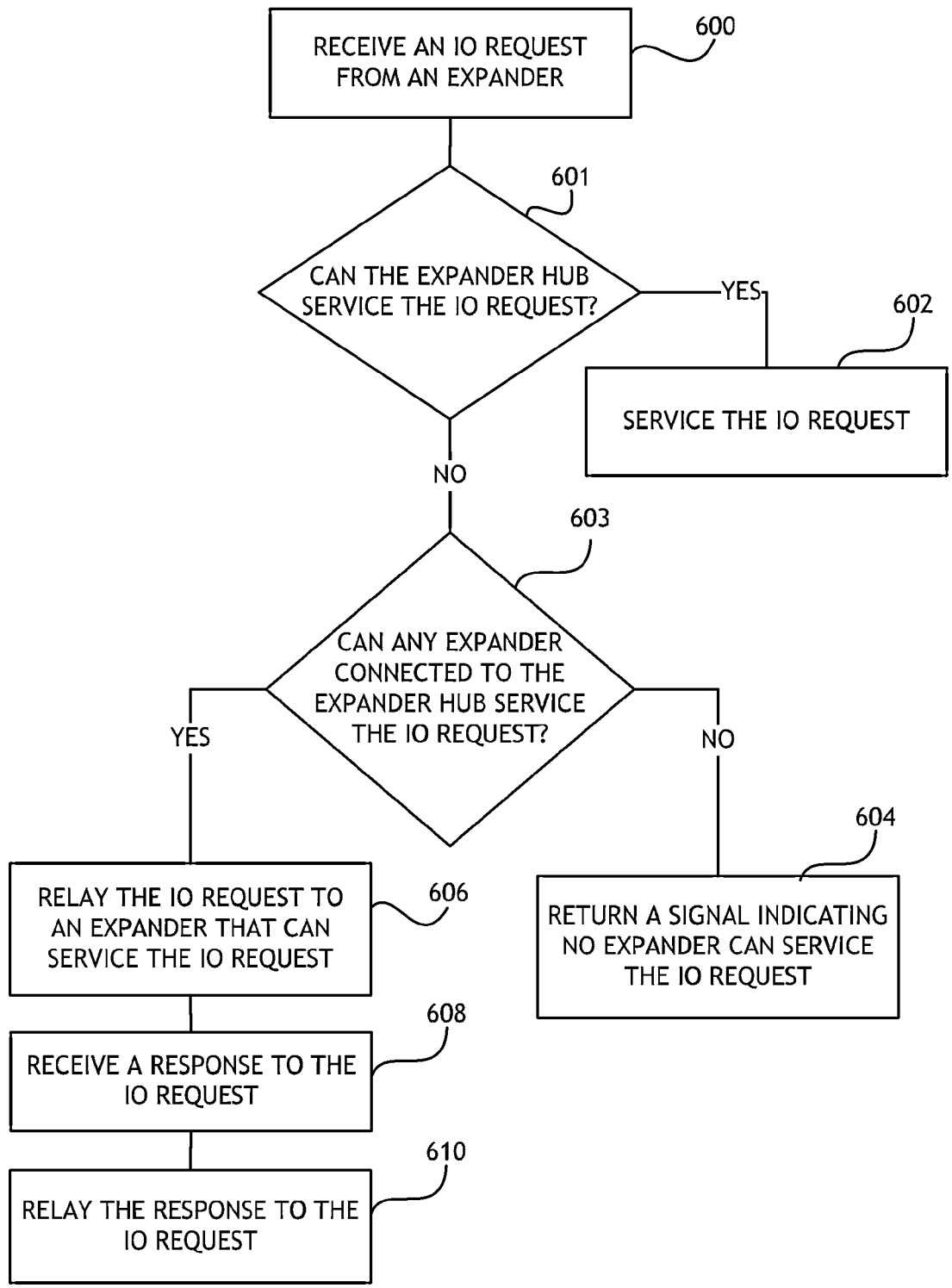
FIG. 6 shows a flowchart for routing signals in a system including at least one SAS expander hub.

Referring to FIG. 6, a flowchart for relaying IO requests in a system including a SAS expander hub is shown. A SAS expander hub may receive 600 an IO request from a SAS expander or another SAS expander hub. The SAS expander hub may determine 601 if the SAS expander hub can directly service the IO request; if so, the SAS expander hub may service 602 the IO request without reference to any connected SAS expanders. If the SAS expander hub cannot service the IO request directly, the SAS expander hub may determine 603 if any SAS expander connected to the SAS expander hub is capable of servicing the IO request. The SAS expander hub may reference a data structure recording all of the data storage devices connected to any SAS expanders connected to the SAS expander hub, or the SAS expander hub may send each SAS expander a query at the time the IO request is received. If the SAS expander hub is not connected to any SAS expander capable of servicing the IO request, the SAS expander hub may return 604 a signal to the device that sent the IO request indicating that the SAS expander hub cannot service the IO request. On the other hand, if the SAS expander hub can service the IO request, the SAS expander hub may relay 606 the IO request to the device that can service the IO request. The device that can service the IO request may be a SAS expander that would further relay the IO request to a data storage device, or the device may be another SAS expander hub that would relay the IO request to a SAS expander that would further relay the IO request to a data storage device. The SAS expander hub may then receive 608 a response to the IO request. The SAS expander hub may then relay 610 the response to the IO request to the device that initially sent the IO request to the SAS expander hub.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A SAS expander hub apparatus comprising:
a processor;
a memory connected to the processor;
a plurality of PHYs connected to the processor, at least one of the plurality of PHYs configured to connect to a first SAS expander, at least one of the plurality of PHYs configured to connect to a second SAS expander, at least one of the plurality of PHYs configured to connect to a third SAS expander, and at least one of the plurality of PHYs configured to connect to a second SAS expander hub; and computer executable program code, wherein the computer executable program code is configured to:

query every device connected to the SAS expander hub to determine the identity of every data storage device directly connected to the SAS expander hub;

query every device connected to the SAS expander hub to determine the identity of every data storage device accessible to the SAS expander hub via the first SAS expander, the second SAS expander, the third SAS expander and the second SAS expander hub;

compile a data structure associating PHYs in the SAS expander hub with data storage devices accessible via such PHYs;

receive an Input/Output (IO) request from the second SAS expander hub; and relay the IO request to at least one of the first SAS expander, the second SAS expander and the third SAS expander;

wherein:

the first SAS expander is connected to the second SAS expander and the third SAS expander; and the second SAS expander is connected to the third SAS expander.

2. The apparatus of claim 1, wherein the computer executable program code is further configured to receive a signal from the second SAS expander hub indicating that the second SAS expander hub is incapable of servicing the IO request.

3. The apparatus of claim 2, wherein the computer executable program code is further configured to send a signal to the second SAS expander hub indicating the SAS expander hub cannot service the IO request.

4. The apparatus of claim 1, wherein the computer executable program code is further configured to receive a response to the IO request from one of the first SAS expander, second SAS expander and third SAS expander.

5. The apparatus of claim 4, wherein the computer executable program code is further configured to relay the response to the second SAS expander hub.

6. A method of relaying IO requests in a system including a SAS expander hub comprising:

querying every device connected to the SAS expander hub to determine the identity of every data storage device directly connected to the SAS expander hub;

querying every device connected to the SAS expander hub to determine the identity of every data storage device accessible to the SAS expander hub via at least one connected SAS expander or connected second SAS expander hub connected to the SAS expander hub;

compiling a data structure associating PHYs in the SAS expander hub with data storage devices accessible via such PHYs;

receiving an Input/Output (IO) request from an initiator connected to the SAS expander hub;

determining that the SAS expander hub cannot directly service the IO request; and relaying the IO request to at least one of a first SAS expander, a second SAS expander and a third SAS expander, wherein:

the first SAS expander is connected to the second SAS expander and the third SAS expander; and the second SAS expander is connected to the third SAS expander.

7. The method of claim 6, further comprising:

receiving a response to the IO request from one of the first SAS expander, the second SAS expander and the third SAS expander; and relaying the response to the initiator.

8. The method of claim 6, further comprising querying each of the second SAS expander and third SAS expander to determine which of the second SAS expander and third SAS expander is capable of servicing the IO request.

9. The method of claim 6, further comprising querying a second SAS expander hub to discover one or more data storage devices connected to one or more SAS expanders connected to the second SAS expander hub.

10. The method of claim 9, further comprising recording the location of the one or more data storage devices in a data structure.

11. The method of claim 9, wherein the second SAS expander and the third SAS expander are connected to the second SAS expander hub.

12. The method of claim 11, further comprising:

receiving a response to the IO request from the second SAS expander hub; and relaying the response to the initiator.

* * * * *